Figure 1:
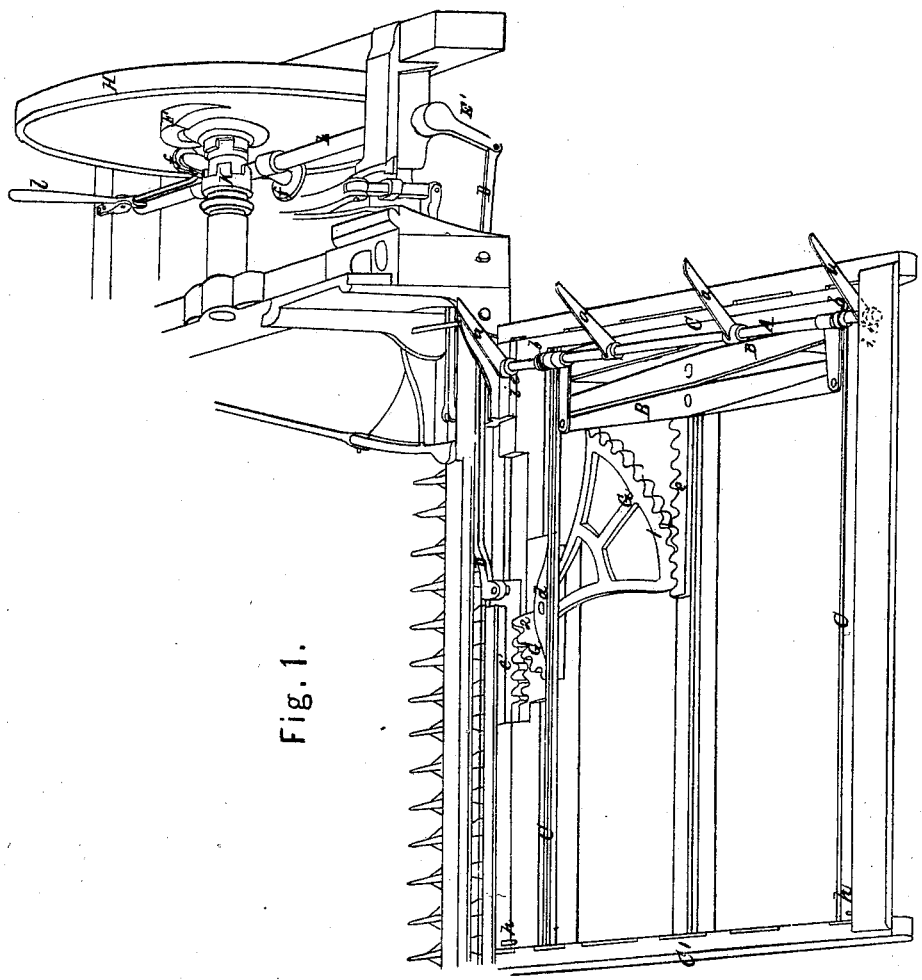

Sheet 1.
2 Sheets.

I. Van Doren.
Harvester Rake.

Nº 18256        Patented Sep. 22, 1857.

Witnesses.

Inventor.

Isaac Van Doren

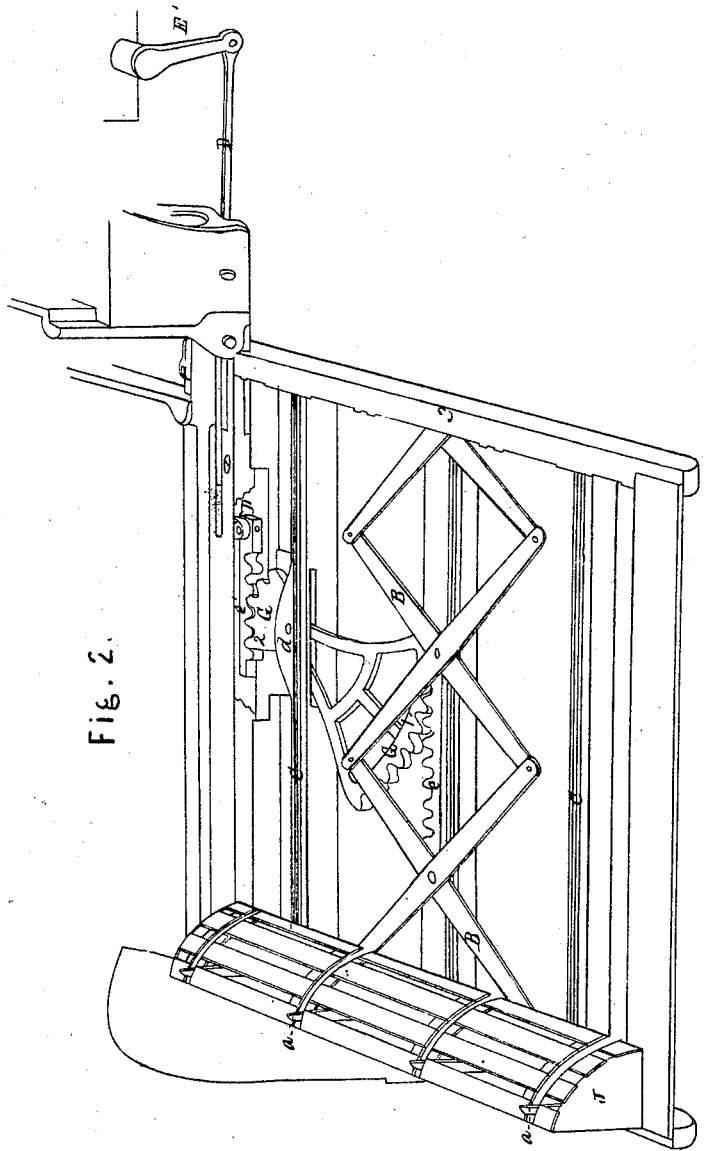

UNITED STATES PATENT OFFICE.

ISAAC VAN DOREN, OF SOMERVILLE, NEW JERSEY.

IMPROVEMENT IN RAKES FOR HARVESTERS.

Specification forming part of Letters Patent No. 18,256, dated September 22, 1857.

*To all whom it may concern:*

Be it known that I, ISAAC VAN DOREN, of Somerville, Somerset county, and State of New Jersey, have invented a new and Improved Mode of Operating Rakes for Harvesters; and I do hereby declare that the following is a full and exact description of its construction and operation, reference being had to the accompanying drawings, and to the letters of reference marked thereon, and making a part of this specification.

Figure 1 shows the rake as it lies after it has swept the grain from the platform, having its operating or extension levers folded upon each other. Fig. 2 shows the rake at the opposite side of the platform in position to take off the grain, the extension-levers being expanded.

The nature of my improvement consists in a peculiar mode of operating the rakes of harvesters.

The rake proper is merely a straight bar or rod, A, having projecting fingers *a a a a*, the number of which may be varied at pleasure, and having friction-rollers *b b* to allow the rake to move easily and with the least possible friction upon the ways or tracks *c c*.

To the bar A are connected by a pivot, so as to allow motion, one end of the expanding levers B B, the other end being securely fastened to the frame or side C of the platform. These levers are fastened to each other at their ends, and also at the middle, so that when expanded they embrace and strengthen each other and when closed they fold upon each other.

As will be apparent from the action of the levers B B, one end being fixed to the platform and the other end attached to the rake-bar A, whenever these levers are expanded or shut they will carry the rake toward the side C′ of the platform or back toward the side C. As the rake A is carried toward C′ the fingers *a a* remain horizontal and pass under the grain on the platform without displacing it. To give these fingers a vertical position, so that as they are moved toward C they will sweep off the grain from the platform, I fix or place in the side C′ a couple or more pins or projections, *h h*, against which the prolongations *i i* of the fingers strike, by means of which the fingers *a a* are thrown up perpendicular in proper position to act against the grain. The grain will of course prevent the fingers from falling until the grain is all carried off the platform. The skeleton guard J, Fig. 2, is to permit the fingers *a a* to take such perpendicular or vertical position, and without carrying up with and behind them any of the grain from the platform. Its face being circular, any cut grain which may fall upon it will at once slide down upon the platform, so that it will be caught and swept off by the fingers.

The levers B B are operated or alternately expanded and folded, and motion thus given to the rake A by means of or through the geared double sector G, which oscillates on the center or pivot *d*. As will be seen, the periphery of each sector is geared, that of the larger sector 1 working into a straight-geared plate or bar, *e*, which connects with or is fastened to the levers B B, while the geared arc 2 works into another straight-geared plate, *e′*, which is connected to the rod D. As will be noticed, the radii of the two sectors are of different lengths, so that the geared arc 1 will act at or about the center of the rake A, thus rendering its motion most steady and uniform, and at the same time give sufficient sweep and motion to the levers B B and rake A without much play or vibration of the rod D.

Vibratory motion is given to the rod D by means of the rock-shaft E, which has upon it the friction-rollers *f f′*, which are acted upon by the cam F upon the wheel H. As the machine is moved the cam F presses against the roller *f′* and turns the shaft E, carrying the arm E′ outward, and with it the rod D and geared plate *e′*, which, through the double sector G, gives a contrary motion to the geared plate *e*, expanding the levers B B, and thus carries the rake A to the position represented in Fig. 2. In completing this motion the cam F has passed the roller *f′*, and immediately comes in contact with the other friction-roller, *f*, by which the rock-shaft is turned in a contrary direction, driving back the rod D and giving a reverse action to the double sector G, which closes the levers B B and places the rake in the position shown in Fig. 1. By this motion of the rake all grain on the platform is taken off by the fingers *a a a a* and deposited on the ground in the rear of the harvester in bundles ready for the binder.

The rake has one motion or sweep for every revolution of the driving-wheel. With a three-foot driving-wheel, therefore, each bundle will contain the cut of nine feet. A larger or smaller wheel or a longer or shorter sickle-bar will vary the size of the bundle.

The relative radii of the sector will vary somewhat, according to circumstances, as the sweep of the rake, the motion of the rod D, or the rock-shaft E; but the principle of action will be the same. The rock-shaft can also be worked in a different manner, as by dispensing with the wheel H, upon which the cams are placed, making the rock-shaft about half its present length and operating it by cams attached to the axle of the driving-wheel, or in other ways, the particular manner of working it not being material, its use to give vibratory motion to the rod D being only important. When worked as shown by the drawings the wheel H becomes an additional driving or bearing wheel, and connects with shaft of the actual driving-wheel by a clutch, K, and by which it is disconnected when the machine is to be turned.

The lever $l$ is to throw the rock-shaft out of gear with the cam F, which is effected by drawing back the friction-roller $f$, so that the cam will not touch or reach it.

Having thus fully described my invention, what I claim as new, and desire to secure by Letters Patent, is—

Operating the rake A, when arranged in relation to the platform as described, by means of the double-geared sector G, in combination with the rod D and rock-shaft E, or their equivalent, the whole arranged and operating substantially in the manner set forth.

ISAAC VAN DOREN.

Witnesses:
  S. D. LAW,
  J. J. PALMER.